United States Patent [19]

Wilson et al.

[11] Patent Number: 4,482,996

[45] Date of Patent: Nov. 13, 1984

[54] FIVE PORT MODULE AS A NODE IN AN ASYNCHRONOUS SPEED INDEPENDENT NETWORK OF CONCURRENT PROCESSORS

[75] Inventors: Jesse R. Wilson, Austin; Gary L. Logsdon, Round Rock, both of Tex.

[73] Assignee: Burroughs Corporation, Detroit, Mich.

[21] Appl. No.: 414,071

[22] Filed: Sep. 2, 1982

[51] Int. Cl.³ .............................................. H04J 6/00
[52] U.S. Cl. .................................. 370/60; 340/825.04
[58] Field of Search ...................... 370/60, 92, 93, 94; 340/825.03, 825.04, 825.52, 825.53; 179/18 FG; 364/200, 900

[56] References Cited

U.S. PATENT DOCUMENTS

| | | | |
|---|---|---|---|
| 3,766,322 | 10/1973 | Moffett et al. | 370/60 |
| 4,237,447 | 12/1980 | Clark | 179/18 FG |
| 4,251,879 | 2/1981 | Clark | 370/60 |
| 4,258,434 | 3/1981 | Glowinski et al. | 370/60 |
| 4,314,367 | 2/1982 | Bakka et al. | 370/60 |
| 4,347,498 | 8/1982 | Lee et al. | 370/60 |
| 4,380,063 | 4/1983 | Janson et al. | 370/60 |

Primary Examiner—Douglas W. Olms
Attorney, Agent, or Firm—Mervyn L. Young; Kevin R. Peterson

[57] ABSTRACT

A five port module as a node in an asynchronous speed independent network of concurrent processors, each port of the module including an input selector switch and an output selector switch such that each selector switch has a plurality of output channels one for each of the output arbiter switches (except the arbiter switch associated with its own port). Each selector switch is adapted to select a particular output channel (arbiter switch) according to the initial bits received in the asynchronous speed independent message. In this manner, the module of the present invention can accommodate up to five simultaneous asynchronous message transmissions without nodal blocking although the average number of simultaneous messages that can be accommodated will be less. The respective arbiter and selector switches are provided with circuitry to respond to a clear signal that resets the corresponding arbiter and selector switches forming a particular transmission path should nodal blocking occur.

8 Claims, 14 Drawing Figures

PORT SIGNALS

FIVE PORT MODULE AS A NODE IN AN ASYNCHRONOUS SPEED INDEPENDENT NETWORK OF CONCURRENT PROCESSORS

RELATED U.S. PATENT APPLICATIONS

U.S. patent applications directly or indirectly related to the present applications are:

Ser. No. 414,069, filed Sept. 2, 1982 by J. R. Wilson et al and entitled "Four Way Arbiter Switch for a Five Port Module as a Node in an Asynchronous Speed Independent Network of Concurrent Processors".

Ser. No. 414,070, filed Sept. 2, 1982 by J. R. Wilson et al and entitled "Four Way Selector Switch for a Five Port Module as a Node Asynchronous Speed Independent Network of Concurrent Processors".

BACKGROUND OF THE INVENTION

1. Field of the Invention

This invention relates to a network of asynchronous speed-independent nodes and more particularly to such a network wherein each node is made up of a five port module of arbiter and selector switches.

2. Description of the Prior Art

Asynchronous speed independent circuits or networks are such that arbitrary delays have no effect upon the circuit operation. An arbiter switch is a switch or node that receives an asynchronous transmission from one of two different input ports and transfers that message in an asynchronous manner to its output port. Such an arbiter switch is disclosed in the Clark U.S. Pat. No. 4,251,879, and also in the Bolton et al U.S. patent application Ser. No. 329,424, filed Dec. 10, 1981, both of which are assigned to the assignee of the present invention.

A selector switch is a switch which receives a message on its input port and transmits it to one of two output ports according to the first bit in the serial transmission to be received. Such a selector switch is disclosed in the Clark U.S. Pat. No. 4,237,447 and also in the Bolton et al U.S. application Ser. No. 329,423, filed Dec. 10, 1981, both of which are assigned to the assignee of the present invention. By employing these two switches, various networks can be created in a variety of configurations such as described in the Barton et al U.S. Pat. No. 4,307,446 and also in the Hagenmaier et al U.S. patent application Ser. No. 281,065, filed July 7, 1981, both of which are assigned to the assignee of the present invention.

In networks such as the type referenced above, a node, desiring to transmit a message to another node, begins its transmission which establishes a path between the respective nodes, which path becomes dedicated to that transmission until an end-of-message signal is received by the destination, and an acknowledge of end-of-message signal is transmitted back through the various switches of the path to the source. In the above-described Barton and Clark patents, such a dedicated path caused delays in freeing the network for the establishment of different transmission paths due to the time it takes for the end-of-message signal to reach the destination and the acknowledge end-of-message signal to be transmitted back to the source. Furthermore, if a particular switch in the established path failed to respond to an end-of-message signal or its corresponding acknowledgment signal, transmission by other nodes could be blocked indefinitely. The switches of the such that any node could unblock a transmission path to its desired destination should that path be blocked for an unduly long period of time.

The above-referenced Hagenmaier application is directed toward a particular network of concurrent processors which are adapted primarily for nearest neighbor communication. In this network, each processor storage module is connected to the network grid by a port formed of three nodes where each node is a hexagonal circuit formed of three selector switches and three arbiter switches. Each such node at most could handle three dedicated message paths and, more often than not, only one. After a few paths have been established between different processors, it becomes increasingly difficult for other sources in the network to establish a transmission path to one of their destinations.

The provision of a clear signal for the switches of the above-described Bolton et al applications freed the available transmission paths to a certain extent. However, any particular port could still handle only a couple of simultaneous transmission paths.

It is, then, an object of the present invention to provide a port for an asynchronous network of concurrent processors that can accommodate a number of different transmission paths.

It is another object of the present invention to provide an asynchronous network port having a number of transmission paths that are not continuously dedicated to the duration of the transmission of a particular message along the path.

It is still a further object of the present invention to provide an asynchronous network port having a number of transmission paths which may be cleared or reset when it is determined that particular paths in the network are not operating properly.

SUMMARY OF THE INVENTION

In order to accomplish the above-identified objects the present invention is directed toward a five port module as a node in an asynchronous speed independent network of concurrent processors, each port of the module including an input selector switch and an output arbiter switch such that each selector switch has a plurality of output channels one for each of the output arbiter switches (except the arbiter switch associated with its own port). Each selector switch is adapted to select a particular output channel (arbiter switch) according to the initial bits received in the asynchronous speed independent message. In this manner, the module of the present invention can accommodate up to five simultaneous asynchronous message transmissions without nodal blocking although the average number of simultaneous messages that can be accommodated will be less. The respective arbiter and selector switches are provided with circuitry to respond to a clear signal that resets the corresponding arbiter and selector switches forming a particular transmission path should nodal blocking occur.

A feature then of the present invention resides in a multiport module for an asynchronous speed independent network each port of which includes an input selector switch having a plurality of output channels, one for each of the arbiter switches of the remaining output ports.

BRIEF DESCRIPTION OF THE DRAWINGS

The above and other objects, features and advantages of the invention will become more readily apparent from a review of the following specification wherein.

GENERAL DESCRIPTION OF THE INVENTION

Figure 1A:
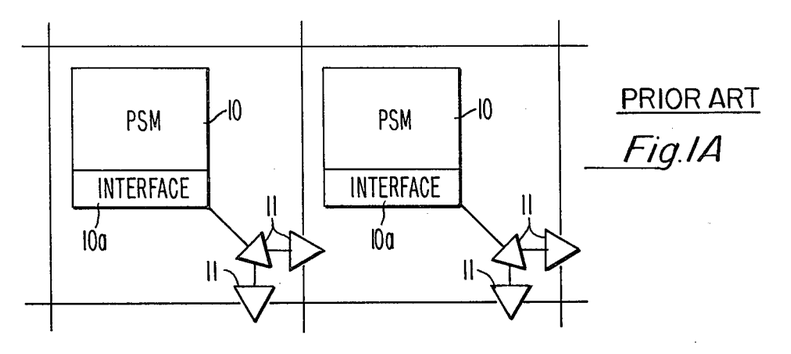
FIGS. 1A and 1B are representations of prior art networks and their corresponding nodes.
Figure 1B:
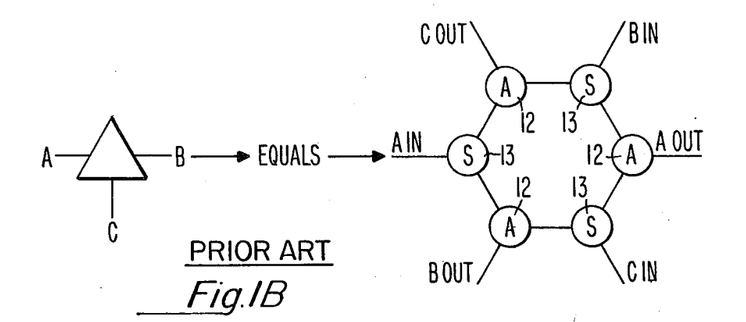

The advantage of using the four way arbiter and selector switches of the present invention is illustrated by comparing a concurrent asynchronous network employing such switches with a corresponding network of the prior art. Such a prior art concurrent network is illustrated in FIG. 1A wherein respective processor storage modules 10 are coupled together by a nearest neighbor switching network that is formed of hexagonal configurations 11 of speed independent arbiter and selector switches. In FIG. 1A, three hexagonal configurations 11 are required for coupling of the corresponding processor storage modules 10 to the network. A more detailed illustration of a respective hexagonal configuration is illustrated in FIG. 1B where three arbiter switches 12 and three selector switches 13 are employed. These arbiter and selector switches are two-way switches. In FIG. 1B, such a hexagonal configuration receives transmission from three different sources and provides transmission to three different destinations and it is for this reason three such configurations are required to couple each processor storage module to its four nearest neighbors in a rectangular matrix-type of network.

It will be understood in FIG. 1B that the hexagonal configuration represents a three port module wherein the A IN and the A OUT form one bidirectional port and so on.

Figure 2A:
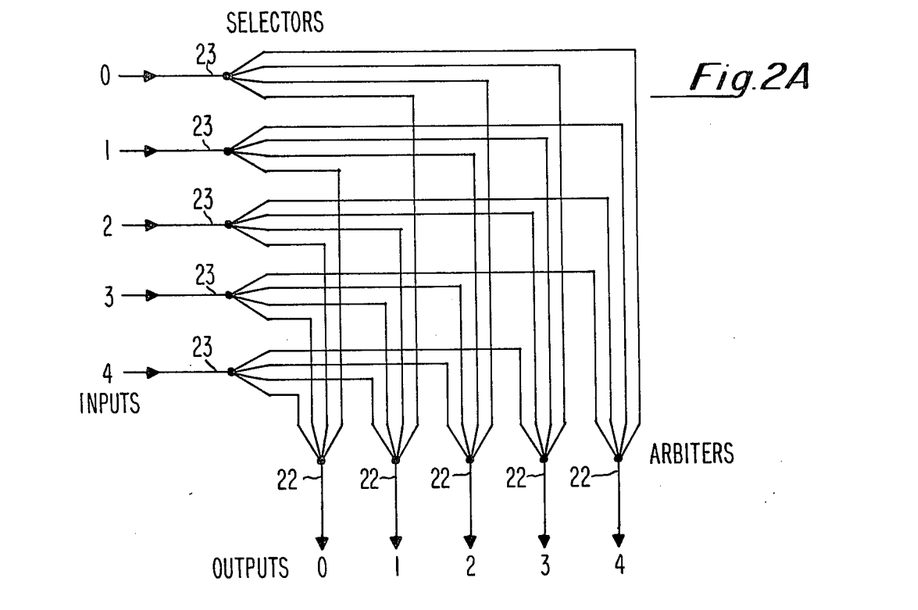
FIG. 2A is a schematic diagram of a multiport molule of the present invention.
Figure 2B:
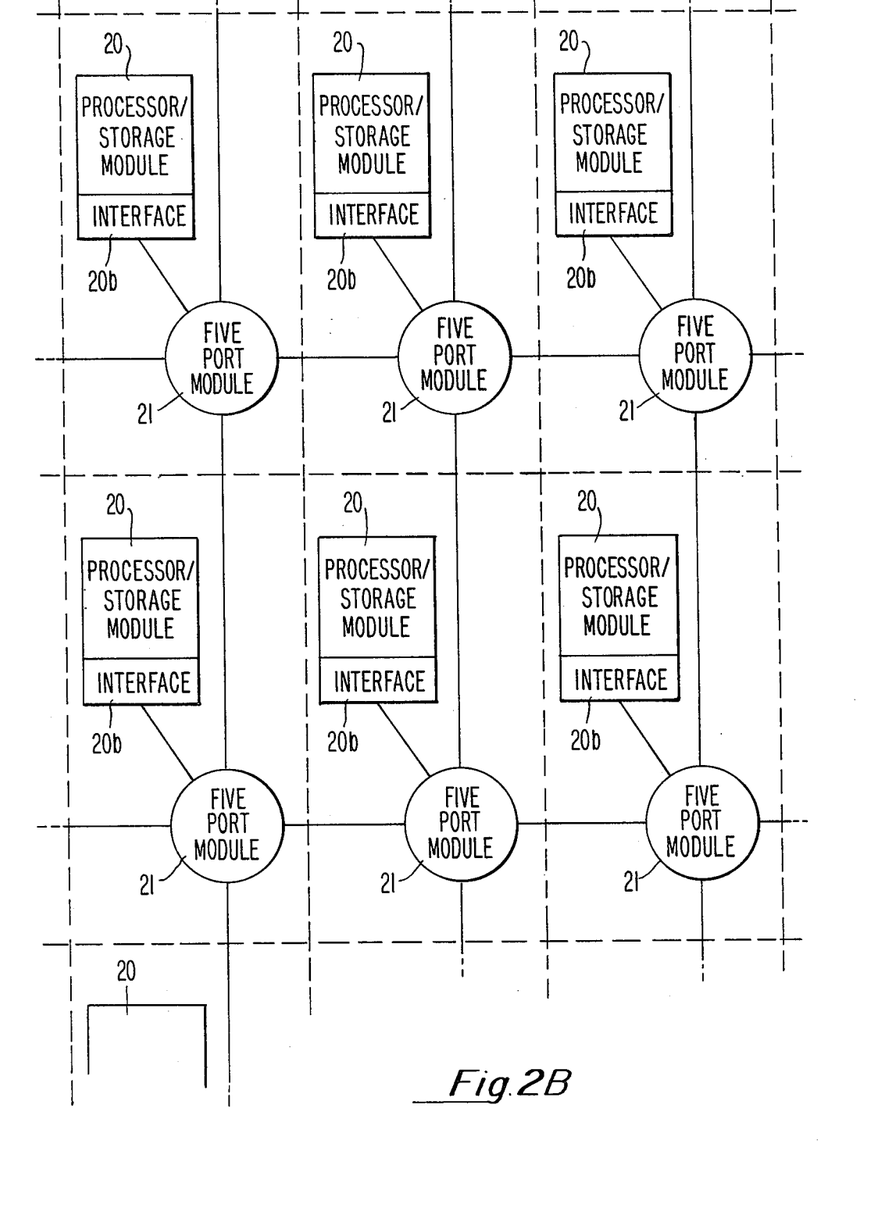
FIG. 2B is a general diagram of an asynchronous speed independent network employing the present invention.

As distinct from the prior art, the present invention employs four-way arbiter and selector switches and the manner in which they are combined to form a five-way port is illustrated in FIG. 2A wherein five four-way selectors 23 receive separate asynchronous messages for transfer to one of five four-way arbiter switches 22, the only restriction being that the input receiving selector for a given port cannot transfer its message to the corresponding output arbiter for that port. A nearest neighbor matrix-type network will now appear schematically as illustrated in FIG. 2B.

With the four-way arbiter and selector switches of the present invention, it will be appreciated that the first two bits of an upcoming message are required to select the appropriate output port as distinct from the two-way selector switches of the prior art where only the first bit of an incoming message was required since the number of output ports it could select were only two.

More importantly, as distinct from the prior art, it will be appreciated from FIG. 2A that an incoming message on a particular input port can select any output port (except its corresponding port) without any nodal blocking unless the arbiter of that particular output port has already been selected for message transmission by another port.

As with prior art networks, transmission between nodes is asynchronous and in a serial manner except that the switching by each of the four-way selector switches is according to the first two bits in the routing field of the message being transmitted, which bits are removed as the message and its routing field pass through the selector switch. Thus, the routing field serves as a routing map for the message as it traverses the network. In order to accommodate such serial transmission, each of the processor storage modules 20 of FIG. 2B is provided with a corresponding communications interface 20b which includes a parallel-to-serial buffer register since the data transfer between the processor and the memory of the respective modules would normally be in the parallel manner.

Figure 3A:
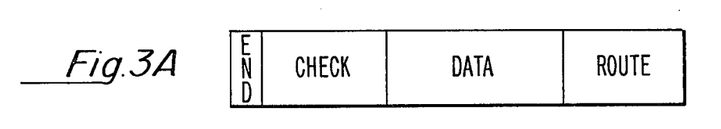
FIG. 3A is a representation of the message format as employed in the present invention.
Figure 3B:
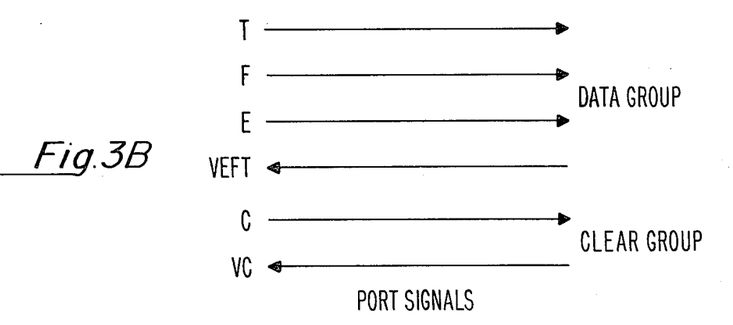
FIG. 3B is a representation of a channel as employed in the present invention.

The format of a message transmission is illustrated in FIG. 3A and begins with (from right to left) the routing field followed by the data field and then by an end-of-message signal. The interface between the respective switches is illustrated in FIG. 3B it being understood that two such interfaces are required by each port for transmissions in opposite directions. Each interface includes a data group of signal lines and a clear group of signal lines.

As illustrated in FIG. 3B, the data group is made up of three signal lines in the forward direction, "T" (TRUE), "F" (FALSE), and "E" (END) to signal the end-of-message. In the reverse direction the data group also includes a "VEFT" (VACANT END, FALSE, TRUE) to acknowledge the transmission of each of the data characters, which acknowledgment is required between the respective switches to accommodate asynchronous transmission.

The clear group of signal lines employs a forward signal "C" (CLEAR) and a reverse signal "VC" (VACANT CLEAR). The clear group of signals is employed for clearing or resetting one or more transmission paths in the event that the transmission path becomes blocked due to any malfunction which prevents completion of the message transmission. It will be appreciated that without the "CLEAR" feature, any purely asynchronous system can become "blocked" as the system cannot distinguish between an event that has not yet occurred (but eventually will) and one that never occurred. Thus, whenever any transmitting processor determines that a desired transmission path has become "blocked", that processor will issue a clear signal to clear a path through the network. Any messages that may be corrupted by that clear signal will eventually be retransmitted by their sender.

DETAILED DESCRIPTION OF THE INVENTION

In order to accommodate asynchronous speed independent action of a network, a "handskaking" protocol is employed between each node or cell in the network. That is to say, a signal is placed on a line from transmitting node to the next node in the network and it remains there until that next node acknowledges the signal's receipt with an acknowledgment signal as was illustrated in FIG. 3B which represents the bus or channel between a sending node and a receiving node. Furthermore, it will be recognized from FIG. 3B, that some sort of signal must be sent in order to be detected by the receiving node or cell. That is to say, if a "1" bit is to be sent, a signal is placed on the true line "T" and if a "0" bit is to be transmitted, the signal is placed on the false line "F". At the end of the message, a signal is placed on the end-of-message line "E" and each of these signals must be acknowledged by a return signal placed on the vacant, end, false, true line VEFT to acknowledge that signal.

A particular circuit that accommodates asynchronous speed independent transmission is a so-called concensus gate or C-element which, in essence, is a memory or latch-type device which retains its previous state as long as it inputs do not agree with one another but switches toward the state of inputs whenever they contain identical values. Various types of concensus gates can be created such as a pure concensus gate, a concensus and enable gate, and a concensus and clear gate. Such gates are illustrated and described in detail in the above-described Clark patents and also the above-described Bolton applications and will not be further described here, although they are employed in numerous ways in the arbiter and selector switches of the present invention.

As was indicated in the above-referenced Barton et al patent, complete networks can be created only of arbiter switches or only selector switches but preferably employ both when bidirectional transmission is required. While the arbiter and selector switches of the present invention can be adapted for such networks, the particular embodiments described below are adapted especially for the five port module of the present invention such that the input ports are selector switches each of which specifically connects with each of the arbiter switches that form the corresponding output ports. To this end, there are other signal lines within the five port module in addition to the external signal lines coming into and leaving the five port module. Furthermore, the arbiter switch contains some signal lines that are not speed independent but which nevertheless do not have an effect on the asynchronous function of the five port module.

The concensus gate handshaking function for an asynchronous network is achieved in the following manner. The consensus gate has two inputs, one from a preceding gate, the other input signal being the inverted output signal of the succeeding gate. When there is no high signal from the preceding gate, the output of the current gate will be low. When a high signal is received from the preceding gate, the inverted output of the succeeding gate will also be high and the current gate switches to a high level and its inverted output switches to a low level signal which is transmitted to the preceding gate to acknowledge receipt of a signal. This causes the output signal from the preceding gate to go low. In the meantime, the succeeding gate has generated a high output signal and the inversion of that output signal is applied to the current gate causing its output signal to go low and so on.

The Selector Switch

Figure 4:
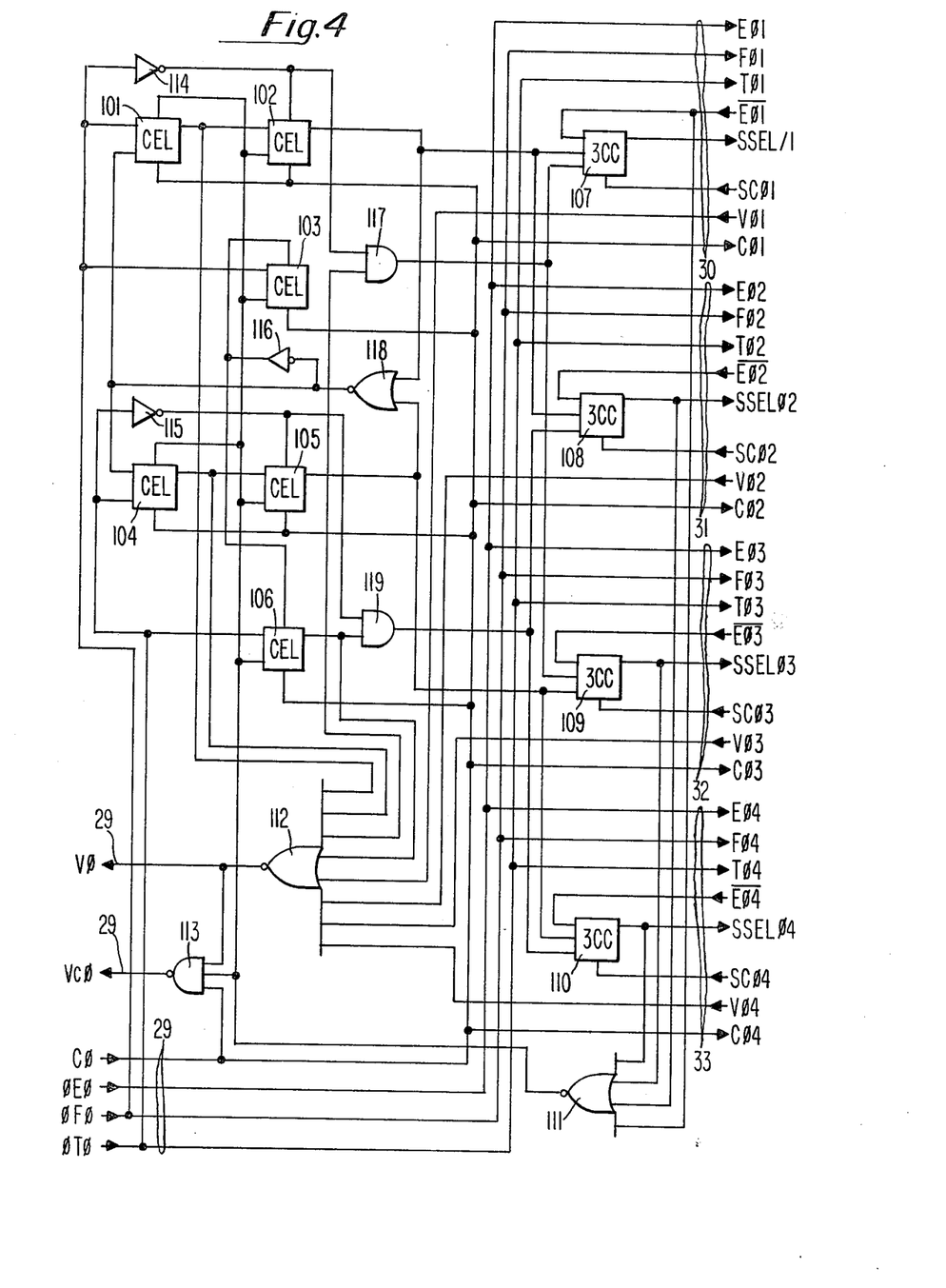
FIG. 4 is detailed schematic diagram of a selector switch of the present invention.

Referring now to FIG. 4, the selector switch will now be described. As shown therein, the switch receives incoming signals and transmits vacant or acknowledgment signals over channel 29 and transfers those signals to and from four separate channels 30, 31, 32 and 33. As was indicated above, the selector decodes the first incoming two bits to determine which output channel is to be selected and those bits are discarded with the remaining routing message and its corresponding data field and end signal being transmitted to all the channels. To this end, the leading bit of the message is latched into concensus gate 101 or 104 of FIG. 4 if that bit is false or true, respectively. After that bit has been acknowledged, it is loaded into concensus gate 102 or 105. This then enables concensus gates 103 and 106 allowing the second bit of the message to be loaded into the appropriate gate. After the second bit has been acknowledged, the two bits are used to enable one of four concensus gates 107–110 in the selector. The enabled concensus gate then disables the concensus gates 101–106 and remains active during the remaining transmission of the message. The enabled concensus gate will not clear itself until the end bit "E" of the message has been received by the corresponding arbiter that has been selected for receipt of transmission.

The acknowledge NOR gate 112 is used to signal the previous stage that one bit of the message has been received or that the receiver is ready to receive another bit. It is activated by reception and storage of the first and second leading bits of the message, and, reception of subsequent bits by the selected arbiters.

The Selector Circuit of FIG. 4 has two operating conditions: idle and busy. If, upon reception of a clear signal the selector is idle, then nothing occurs except that acknowledgment of the clear signal by the selector is made by transmission of the vacant or acknowledge signal to the sending node. This is accomplished with AND gate 113 in conjunction with NOR gates 111 and 112. If the selector is busy when the clear signal is received, then concensus gates 101–106 are cleared. The clear signal is then sent to the selected arbiter in the path. Upon acknowledgment of the clear signal by that arbiter, the Hold concensus gates 107–110 are cleared. This action will ensure that the input to gates 111–112 are all zero, indicating that the selector has been cleared. When this happens, NAND gate 113 will acknowledge reception of the clear signal and this signals the transmitting node to stop sending a clear signal.

The Arbiter Switch

As was indicated above, each input port selector places the incoming data and related information on all of its output paths to the various output port arbiters and then signals a particular arbiter that has been selected in accordance with the first two bits of the routing data. Such an arbiter switch is shown schematically in block form in FIG. 5 and includes arbitration logic 35 which selects between four different selector outputs all of which are requesting the same arbiter, multiplexer 36 which receives and transmits the data and related information from the selected selector to the next node in the network and clear logic 37.

Figure 5:
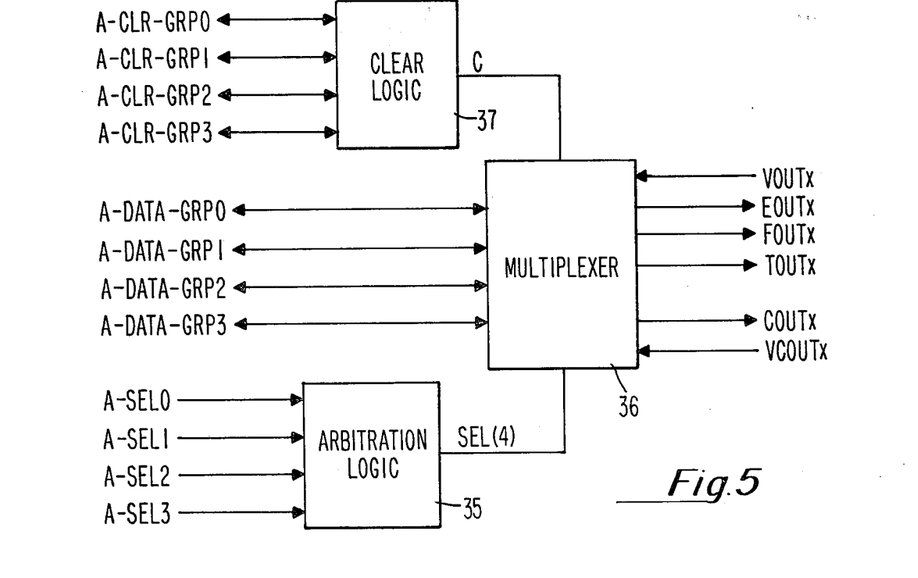
FIG. 5 is a general block diagram of an arbiter switch as employed in the present invention.
Figures 6, 6B:
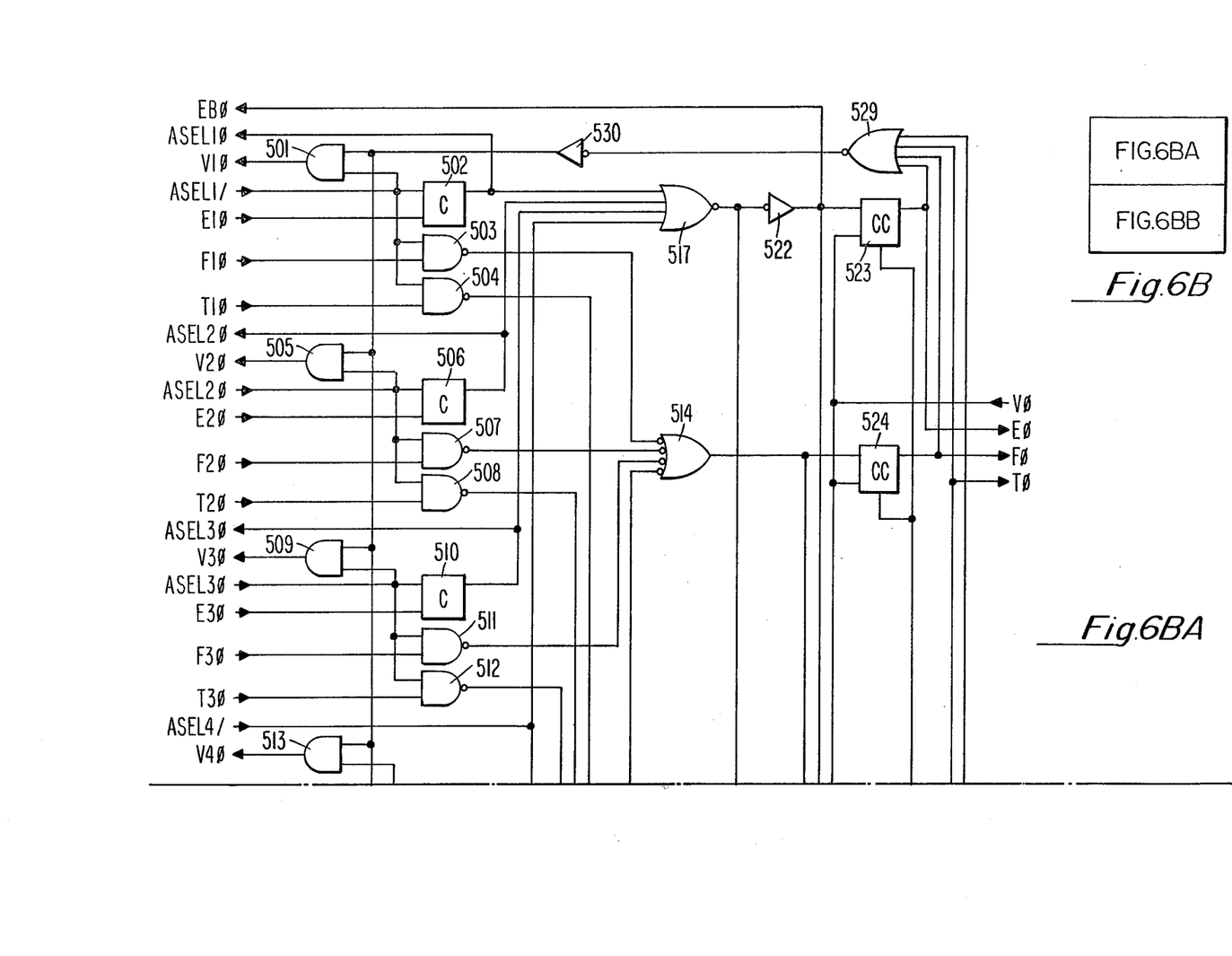
FIGS. 6A-D are detailed schematic diagrams of an arbiter switch of the present invention.
Figure 6:
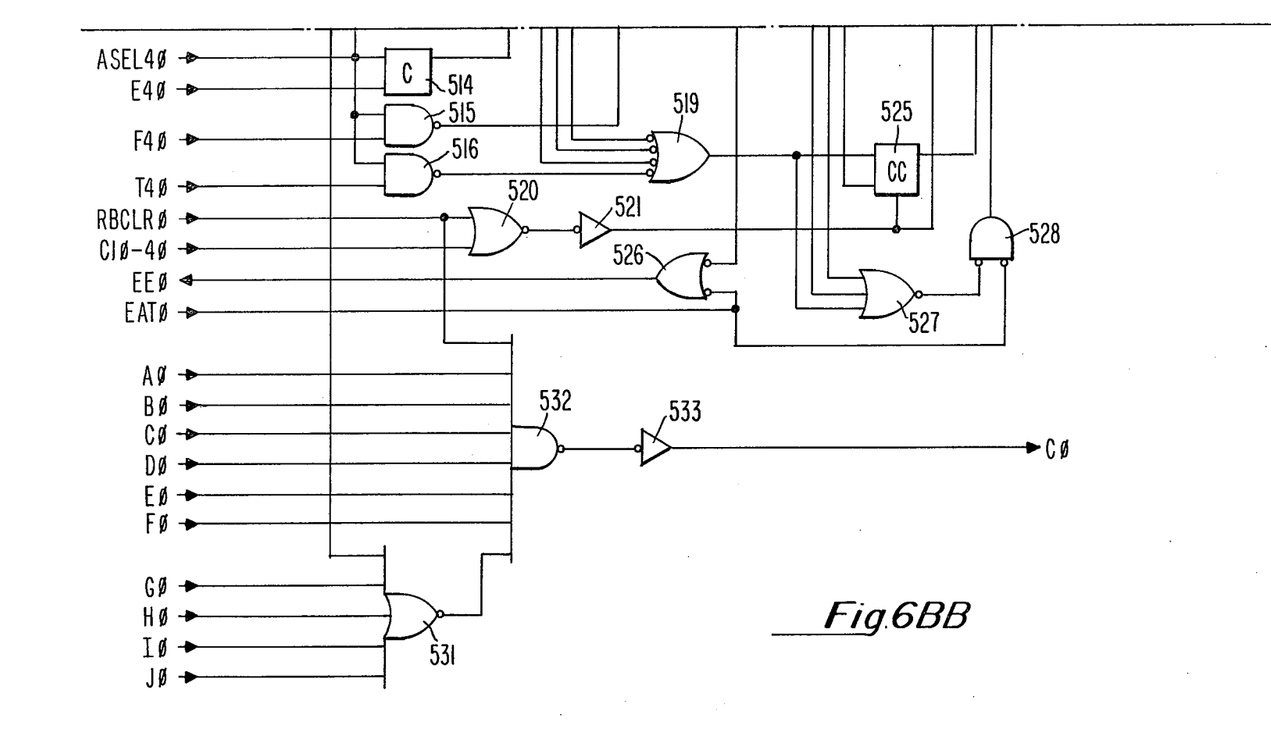
Figure 6A:
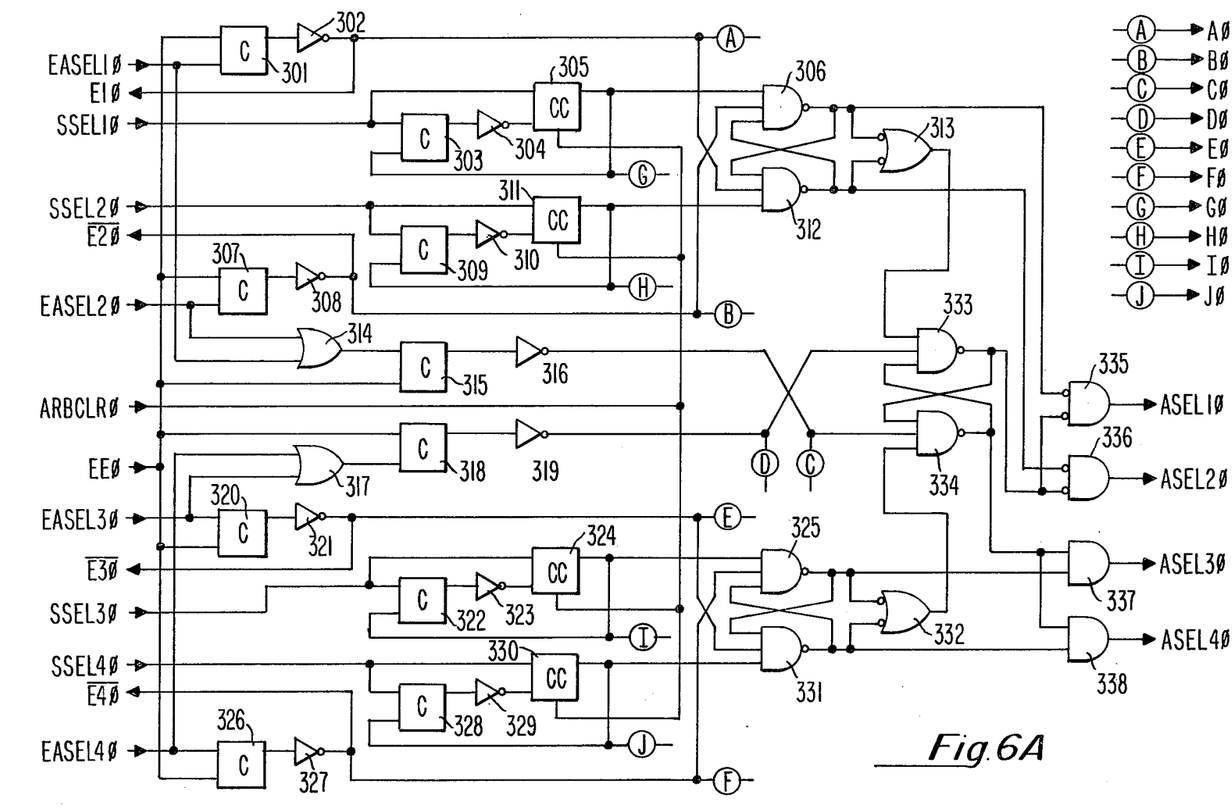

Arbitration logic 35 in FIG. 5 is illustrated in more detail in FIG. 6A. The arbitration circuit of FIG. 6A is the intelligent portion of the arbiter switch. It is used to determine which one of four messages arrived first at the arbiter inputs. Under normal operating conditions, the presence of a signal at one of the inputs to concensus gates 303 and 305 indicates that a message has arrived. The output of concensus gate 305 goes "true" causing the output of NAND gate 306 to go "false". The output of NAND gate 313 will go "true" causing NAND gate 333 to go "false". NOR gate 335 is then driven "true" asserting the select for the channel on which the message appeared.

When more than one message arrives at the same time, two levels of arbitration resulting from the cross-coupled NAND gates 306 and 312; 325 and 331; 333 and 334 will determine which of the signals arrived first. None of the signals have an inherent priority over the others. The only priorities assigned to the signals are a result of their arrival sequence. Eventually all the messages will be sent through the arbiter switch.

The function of the logic elements used to generate the signals A-F is two-fold. They prevent the outputs of the cross-coupled NAND gates from changing when an end bit is received and then reset the Hold concensus gate in the selector that is communicating with the arbiter switch. Not until the end bit has been stored in the arbiter switch will this logic allow the state of the arbitration circuit to change.

The edge detection logic (gates 303-305; 309-311; 322-324 and 328-330) is used under abnormal operating conditions. If the input to this logic goes "true" and then remains "stuck" at that level, this logic is employed to disable the input to the cross-coupled NAND gates so that one channel will not be permanently selected. The channel will be permanently selected until the first time a clear signal is received. When the clear signal is received, the "stuck" channel will be permanently deselected.

The multiplexing circuit 36 in FIG. 5 is illustrated in more detail in FIG. 6B. This circuit has four identical sets of four logic elements (501-504; 505-508; 509-512 and 513-516) which are used to combine the four input channels to the arbiter switch into one output channel. Each set of four is enabled by a different select line from the arbitration circuit of FIG. 6A. The outputs of the sets are combined by way of NOR gate 517 and NAND gates 518 and 519. The outputs of these gates are stored in the storage element concensus gates 523-525. When one of the channels is enabled, message bits will be multiplexed into the storage elements and acknowledged through NOR gate 529, inverter 530, one of the four acknowledge AND gates 501, 505, 509 and 513, and then on back to the transmitting selector.

Figure 6C:
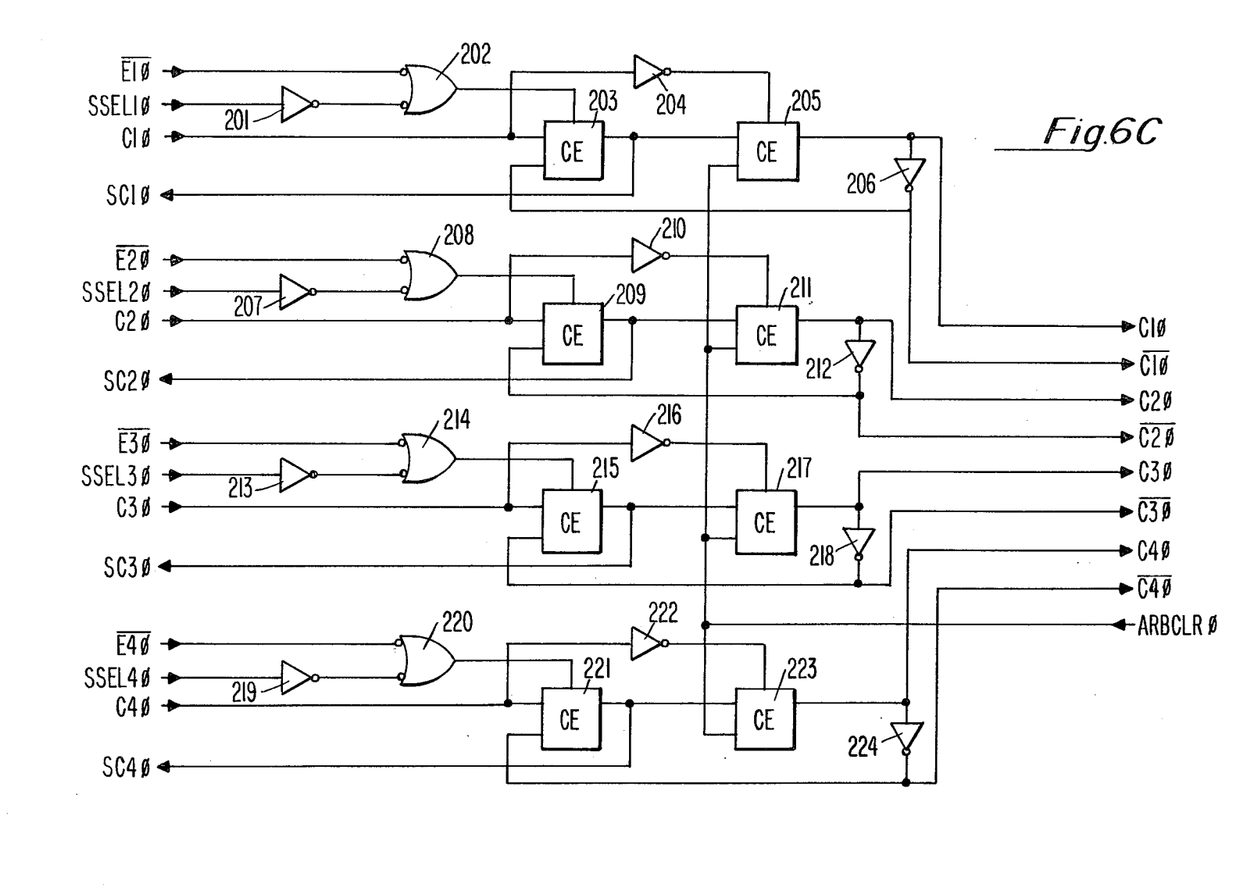
Figure 6D:
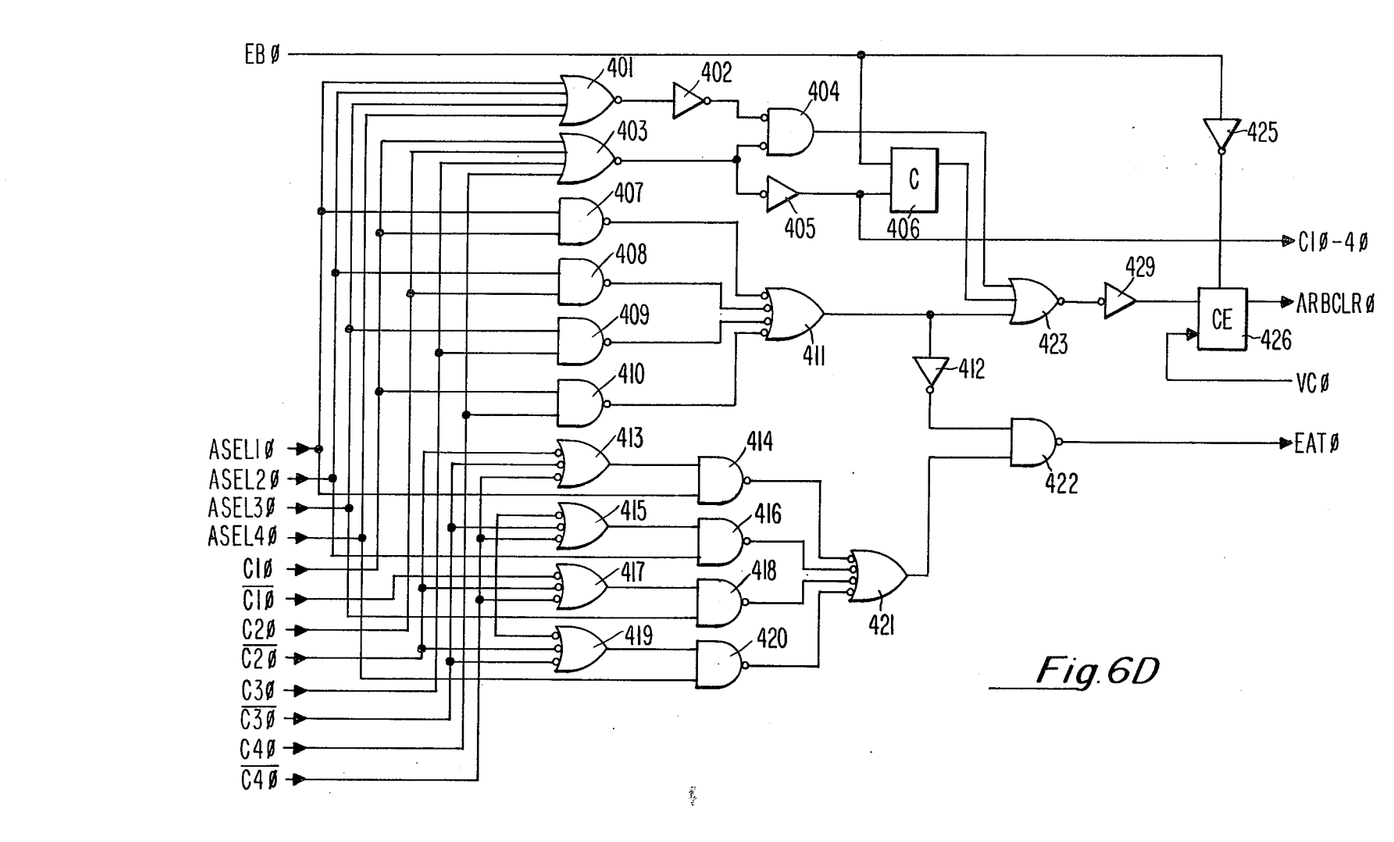

Clear logic 37 of FIG. 5 is more clearly shown in detail in FIG. 6C and 6D. A clear signal can occur while the output switch is one of three states: arbiter idle; arbiter busy and the clear is received on the active channel; arbiter busy and the clear is received on a selected but it inactive channel. In all three cases, the reception of the clear signal occurs in the same fashion. A clear signal is received on an input channel to the arbiter and is input to clear concensus gates 203, 209, 215 and 221 of FIG. 6C depending upon the channel. For an arbiter to receive the clear signal the previous selector must be busy. This means that the clear concensus gates are enabled and the clear signal is allowed to appear on outputs of the clear storage concensus gates 205, 211, 217 and 223.

If the arbiter is idle, then the output of NOR gate 404 of FIG. 6D will be "true", this causes the output of concensus gate 426 to go "true" forcing the arbiter to clear itself.

If the arbiter is busy and the clear signal is received on the active channel, then the output of NAND gate 411 goes "true" having the same effect as the previous case.

If the arbiter is busy and the clear signal is received on a selected but inactive channel, then the output of NAND gate 421 will go "true". The output of NAND gate 422 will in turn go "false". This will enable the discarding circuitry used to eliminate the remains of the message whose leading bits have been cleared from the network. This circuitry consists of logic gates 526-528 of FIG. 6B. In that figure, NAND gate 526 is used to "fool" the end bit detection in the arbitration logic. This is done to insure that the complete message is cleared from the network before the arbitration logic is allowed to change state. NOR gate 527 and 528 are used to bypass the normal acknowledge process because the storage concensus gates 523-525 are cleared immediately upon receipt of the clear signal. When the end bit of the message is received, it is detected, acknowledged and used to inhibit the clearing of the rest of the arbiter switch until the selector switch has stopped transmitting the end bit. Once the end bit has been discarded, concensus gate 426 of FIG. 6D is enabled and the rest of the arbiter is cleared.

In all three cases, once the arbiter switch is cleared all the inputs to NOR gate 531 of FIG. 6B are "false" and all the inputs to NAND gate 532 are "true". Once these conditions are "true" the clear signal is allowed to propagate to the next selector in the path.

Speed Independent Circuitry

Although the five port module of the present invention functions as a speed independent black box, the circuitry contains elements that are speed dependent. Care must be taken to insure that the speed dependent elements do not adversely affect the behavior of the five port module. All of the occurrences of speed dependence can be grouped into one of two categories "feedback" in a concensus gate, and simple race conditions where a signal traverses two different paths to reach the same logic.

EPILOGUE

A five port module has been disclosed for employment as one of a plurality of nodes in a matrix network of concurrent processors which network is asynchronous and speed independent. Each port of the module is provided with an input selector switch and output arbiter switch. Each selector switch is provided with a plurality of output channels for connection respectively to each of the arbiter switches except the one associated with its own port. In this manner, a number of simultaneous asynchronous message transmission can be handled by the node without nodal blocking. Each of these switches is adapted to receive a clear signal to reset that switch should it be determined that a particular transmission path has been blocked due to a malfunction within any particular switch. If a clear signal is received by an idle selector, switch, it terminates. If any one of the selector switch channels is busy, the selector switch is reset and the clear signal is propagated along that channel to the corresponding arbiter switch. When a clear signal is received by an arbiter switch, it is cleared or reset and the clear signal transmitted on to the next node.

While but one embodiment of the present invention has been disclosed, it will be obvious to those skilled in the art that variations and modifications may be made therein without departing from the spirit and scope of the invention as claimed.

What is claimed is:

1. A multiport module forming a node in an asynchronous digital communication network, said module having a number of ports which number is greater than two, said module comprising;

each port having an input means and
   an output means; and
   connection means for coupling each of said input means to each of said output means except for the output means of the port of the corresponding input means;
   each of said input means including selection circuit means adapted to receive said data signals preceded by routing bit signals specifying which of said output means is to be selected for subsequent transmission and to signal the selected output means;
   each of said selection circuit means includes means to make a selection by utilizing together, the first set of bits of the routing signal received, said first set of bits corresponding to that number of bits necessary to specify any one of said number of output means, which number of bits is greater than one.

2. A module according to claim 1 wherein each of said input means includes:

clear circuit means to receive the clear signal from an outside source and to reset said selection circuit means.

3. A module according to claim 2 wherein:

said clear circuit means is adapted to transmit said clear signal to a selected output means.

4. A module according to claim 1 wherein each of said output means includes:

an arbitration circuit means coupled to said respective different input means to receive said respective data signals and select the first set of data signals to be received for subsequent transmission to a destination.

5. A multiport module forming a node in a serial asynchronous communication network, said module having a number of ports, which number is greater than two, said module comprising;

each port having an input means and
   and output means; and
   connection means for coupling each of said input means to each of said output means of the other ports;
   said input means including selection circuit means to receive said data signals preceded by routing bit signals specifying which of said output means is to be selected for subsequent transmission;
   each of said selection circuit means includes means to make a selection by utilizing together, the first set of bits of the routing signal received, said first set of bits corresponding to that number of bits necessary to specify any one of said number of output means, which number of bits is greater than one.

6. A module according to claim 5 wherein each of said output means includes:

an arbitration circuit means coupled to said respective different input means to receive said respective data signals and select the first set of data signals to be received for subsequent transmission to a destination.

7. A module according to claim 6 wherein each of said output means includes:

clear circuit means to receive the clear signal from a coupled input means and to reset said arbitration circuit means.

8. A module according to claim 7 wherein:

said clear circuit means is adapted to transmit said clear signal to said destination.

* * * * *